United States Patent Office 3,262,761
Patented July 26, 1966

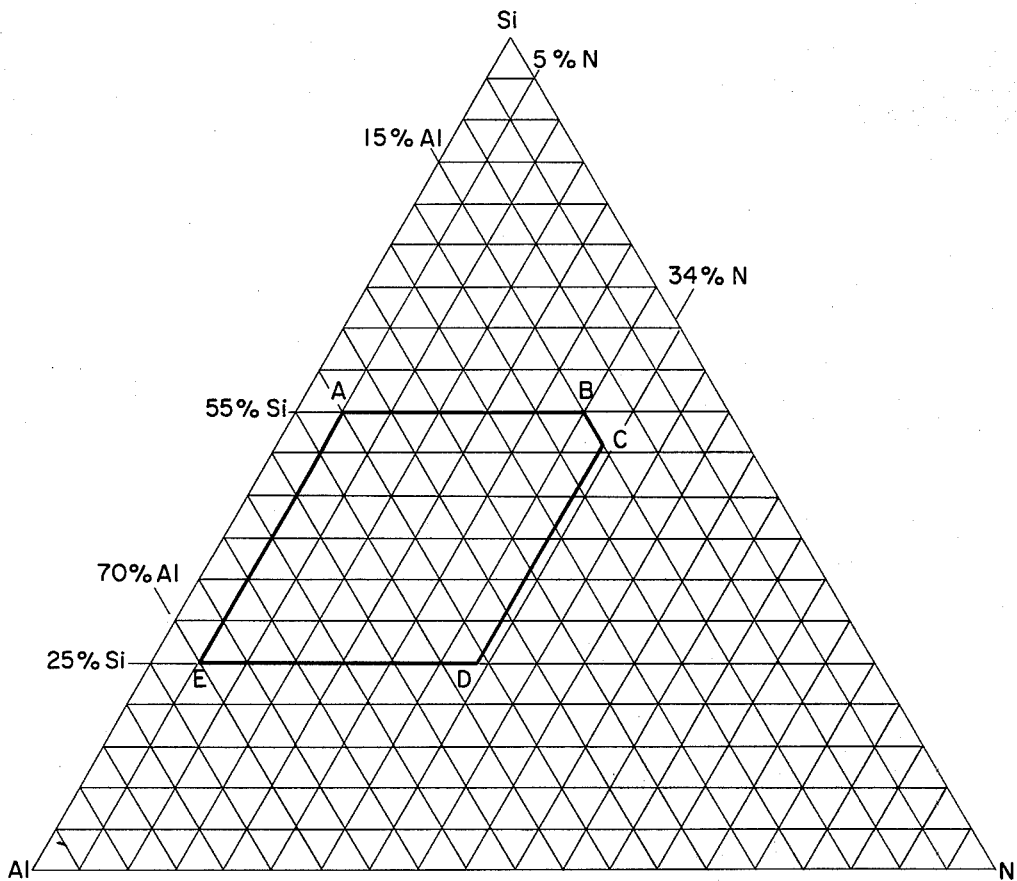

3,262,761
HIGH TEMPERATURE-RESISTANT MATERIALS OF ALUMINUM, NITROGEN, AND SILICON AND PREPARATION THEREOF
Max F. Bechtold, Kennett Square, Pa., assignor to E. I. du Pont de Nemours and Company, Wilmington, Del., a corporation of Delaware
Filed Oct. 3, 1963, Ser. No. 313,481
9 Claims. (Cl. 29—182.5)

This application is a continuation-in-part of my copending, coassigned application Serial No. 78,830, filed December 28, 1960, and now abandoned.

This invention relates to novel high temperature-resistant compositions of matter containing aluminum, nitrogen and silicon, to such compositions modified with oxygen, to articles of manufacture prepared from or composed of these compositions, and to a method for preparing such articles.

Recently there has been great interest in materials capable of withstanding high loads at elevated temperatures and also capable of resisting corrosion by hot gases. Demand for such high temperature materials has been especially heavy since commercial development of jet engines and rockets, which have been progressively improved in design to operate at higher and higher temperatures. Many high temperature metals, including superalloys and the refractory metals, such as molybdenum, have been used as turbine blades, fans, nozzles for jet engines, gas turbines, rockets, and the like, but such materials have not been too satisfactory in view of the increased high temperature requirements imposed. These materials tend to soften at high operating temperatures or require protective coatings against oxidation, and are in general difficult to machine into precise shapes. Other materials proposed for these uses, such as graphite, silicon carbide and metal oxides, suffer from similar deficiencies as well as brittleness.

The present invention provides materials and shaped objects, having high strength and durability at elevated temperatures in air, which are derived from readily available inexpensive light elements. These materials and shaped objects are strong and low in density, have excellent high temperature properties, and are machinable to a considerable degree. The materials and shaped objects contain two essential property-defining structures, viz., a solid continuous matrix structure and a metallic structure, both of which are discussed in detail below. The essential elemental constituents are aluminum, nitrogen and silicon in the proportions, by weight, of 15–70% Al, 5–34% N, and 25–55% Si. The materials and objects of this invention may also contain up to 30% oxygen in the form of its compounds with aluminum and/or silicon, these percentages being in terms of percent by weight of total Al, N, and Si.

The figure is a triaxial diagram illustrating the Al-N-Si compositions of the invention. In the figure the three axes or base lines of the diagram define weight percentages of each of the three essential elemental constituents, aluminum, nitrogen and silicon, present in the compositions. The area within the polygon ABCDE defines the limits of the relative proportions of the three components. Each point within the area defined by connecting the points A, B, C, D and E corresponds with a composition within the scope of my invention. The individual points represent the following compositions which also fall within the claimed invention: Point A is 40% Al, 5% N, 55% Si; point B is 15% Al, 30% N and 55% Si; point C is 15% Al, 34% N and 51% Si; point D is 41% Al, 34% N, and 25% Si; and point E is 70% Al, 5% N and 25% Si.

The shaped objects or articles of manufacture of this invention are prepared by machining or otherwise shaping materials of this invention or by initially forming the materials in the desired shape. The materials and shaped objects, sometimes referred to as converted composition, objects or articles, are prepared from powder metallurgy compositions, as hereinafter described. It is to be understood that the term converted compositions as herein employed is generic to shaped objects.

The manner in which the elemental constituents are combined is a critical aspect of the materials and objects of this invention. These materials and objects are composed of a solid continuous matrix structure, refractory at high temperature and semi-metallic or non-metallic in nature. This structure contains aluminum nitride as an essential strength-producing constituent and may also contain silicon nitride and oxides of aluminum and silicon.

The other essential property-defining structure, which is metallic, constitutes up to 85%, preferably up to 70%, by weight of the converted objects. This structure may be composed of silicon but is preferably composed of alloys thereof, such as aluminum-silicon alloys, for increased machinability, good electrical and thermal conductivity, good impact resistance and improved oxidation resistance at temperatures of 1400–2000° C. The metallic structure is fluid at high temperature and is able to flow, diffuse or migrate to the surface of the shaped object to provide upon contact with the atmosphere a siliceous oxidation-resistant layer which is self-healing, i.e., reforms immediately if ruptured at high temperature in air. The metallic structure may, of course, contain other phases dispersed therein, which may be metallic or non-metallic, separate from the rigid matrix structure. The metallic structure tends to be continuous, especially when it comprises above about 20% by weight of the final converted composition.

To insure adequate self-healing properties, it is essential that the silicon or aluminum-silicon alloy of the metallic structure constitute at least 5%, preferably at least 10% (by weight) of the materials and objects of this invention. The presence of the metallic structure is easily demonstrated by metallography, including hardness measurements, and by X-ray diffraction techniques. When the metallic structure is above about 20% by weight of the converted composition and is chiefly Al, very high electrical conductivity is shown. The proportion of aluminum and silicon in the converted compositions is readily calculated from composition data utilizing the well established chemical fact that aluminum nitride is the most stable at high temperatures of the nitrides of elements present in the converted compositions of this invention. Thus, nitrogen present in the compositions is calculated first as aluminum nitride, AlN; any remaining nitrogen is then calculated as silicon nitride, $Si_3N_4$. After apportionment of the nitrogen in the composition, oxygen, if present, is similarly distributed first to aluminum in the form of $Al_2O_3$, then to silicon in the form of $SiO_2$. The amounts of aluminum and silicon thus accounted for in terms of nitrides and oxides are subtracted from the total amounts present in the composition, leaving as difference the amounts of aluminum and silicon present in the metallic structure.

It will be apparent from the foregoing that the materials and articles of manufacture of this invention do not encompass simple mixtures or complex compounds composed entirely of the nitrides and/or oxides of aluminum and silicon. These articles cannot be obtained from mixtures composed entirely of such nitrides or oxides. In other words the compositions are not composed entirely of combinations of AlN, $Si_3N_4$, $Al_2O_3$, and $SiO_2$, although AlN is always present and $Si_3N_4$ and $Al_2O_3$ are usually present.

The desired converted compositions containing the two structures as discussed above with the resultant high temperature strength properties, oxidation resistance (oxidation may occur, but the resultant oxide forms a protective coating) and good degree of fabricability are obtained with aluminum-nitrogen-silicon compositions provided the constituents are present within the percentage ranges specified, viz., 15–70% Al, 5–43% N, and 25–55% Si. Partial oxidation products of these compositions containing up to 30% oxygen (based on total of aluminum, nitrogen, and silicon) are also desirable compositions and exhibit outstanding high temperature properties. These converted compositions of aluminum-nitrogen-silicon and their oxidation products have high strength-to-weight ratio, good dimensional stability in air to temperatures of 1650° C. and higher, and are readily fabricated and finished to exact dimensions.

The composition of materials and shaped objects prepared from various mixtures of aluminum and silicon nitride heated in an inert atmosphere (e.g., argon) is indicated in the table below. The compositions after heating corresponding to reaction of the starting materials according to $$4Al + Si_3N_4 \rightarrow 4AlN + 3Si$$

TABLE I

*Composition of Al-N-Si materials*

| Starting Materials (Molar Ratio) | Composition (Percent by Weight) | | | Composition After Heating (Molar Ratio) |
|---|---|---|---|---|
| | Al | N | Si | |
| Al/Si₃N₄ | 16.13 | 33.49 | 50.38 | AlN/0.75 Si/0.75 Si₃N₄. |
| 2Al/Si₃N₄ | 27.78 | 28.84 | 43.38 | 2AlN/1.5 Si/0.5 Si₃N₄. |
| 3Al/Si₃N₄ | 36.58 | 25.33 | 38.09 | 3AlN/2.25 Si/0.25 Si₃N₄. |
| 4Al/Si₃N₄ | 43.48 | 22.57 | 33.95 | 4AlN/3Si. |
| 7.2Al/Si₃N₄ | 58.06 | 16.75 | 25.19 | 4AlN/3Si/3.2Al. |

Changes in the composition illustrated above will of course result if firing of the aluminum-silicon-nitrogen composition is carried out in a reactive atmosphere, such as air or nitrogen. In such products oxides and/or higher proportions of nitrides may be present.

Oxygen is supplementary to nitrogen in the sense that oxygen in combination with aluminum and silicon provides refractory phases for the rigid matrix of the alloys of this invention. Oxygen is preferably introduced by high temperature heat treatment in air of a composition containing aluminum, nitrogen, and silicon. It is desirable that the oxygen content not exceed 30% based on a total of aluminum, nitrogen, and silicon.

Converted compositions outside the above defined ranges are deficient in such properties as transverse rupture strength, resistance to high temperature oxidation and freedom from mechanical defects. The use of less than 15% aluminum is undesirable because of the extreme brittleness of the products. On the other hand, when more than 70% aluminum is present, the high temperature strength is undesirably low and the compositions exhibit cracking and poor shape stability during firing in air. Articles with excellent strength and oxidation resistance are obtained when the aluminum content is in the range of 15–65%, and preferably in the range of 18–58%.

The use of less than 5% nitrogen also leads to poor shape stability and to low high-temperature strength. When more than 34% nitrogen is employed, the compositions are undesirably brittle and sensitive to moisture. Articles made from compositions containing 10–30% N have very desirable properties and the best combination of properties is obtained when the nitrogen content is in the range of 10–28%.

Proportions of silicon below 25% lead to reduced oxidation resistance, while the use of more than 55% silicon leads to excessive brittleness and to silicon exudation when the converted composition is employed at temperatures in the range of 1400° C. and above.

The materials and objects of this invention are prepared from powder metallurgy compositions which contain as their essential ingredients aluminum, nitrogen, and silicon in the proportions, by weight, 15–70% Al, 5–34% N, and 25–55% Si. Such compositions may also contain up to 30% oxygen, preferably in the form of one of its compounds with aluminum and/or silicon, the percentages being by weight of total Al, N, and Si. The total of aluminum and silicon must exceed that required to react with the desired amount of oxygen and nitrogen by at least 5%, preferably at least 10%, by weight. The preferred amounts of the essential elements are the same as those mentioned above in connection with the converted compositions of this invention.

In preparing the converted compositions of this invention the elements themselves or compounds and alloys thereof can be employed. For example, the compositions can be prepared by heating together aluminum with silicon nitride and silicon (as required). Alternatively, all or part of the aluminum may be introduced in the form of an aluminum-silicon alloy and part of the aluminum and nitrogen can be introduced as AlN, but this is not preferred. Nitrogen can also be incorporated by heating aluminum and silicon in the presence of a nitrogenous atmosphere.

Particularly useful powder compositions for producing the converted compositions of this invention are obtained by grinding together silicon nitride and aluminum, or silicon nitride, aluminum and silicon in such proportions that the resulting powder falls within the ranges of composition described above. It is preferred that at least 75% (by weight) of the powder composition has a particle size of less than 75 microns, since uniform converted compositions are readily obtained from such powders. However, as illustrated in the examples, powders ranging in particle size up to 150 microns yield useful converted objects, and powders of even larger particle sizes are sometimes employed. To insure substantial homogeneity of the powder metallurgy composition, the particulate raw materials used to make up the composition are intimately mixed either during grinding or, if properly sized, powdered components are initially employed, after or during their placement in a common container.

The powder metallurgy compositions are readily shaped, for example, by cold-pressing at a pressure of 5000–60,000 lb./sq. in. or more, by slip-casting, or by extrusion at a temperature below 700° C., and are then transformed to converted compositions by firing at a temperature of at least 700° C., but preferably not above 1700° C. Most preferably the temperature is in the range of 750–1500° C. Firing can be carried out in air, in an inert atmosphere, in vacuum, or in nitrogen if a nitrogen deficient composition is being utilized. Sintering in nitrogen at about 850° C. produces exceptionally strong objects. Since an exothermic reaction occurs when the powder metallurgy compositions are heated to firing temperature, the actual temperature attained by the composition during conversion to alloys is usually much higher than the nominal firing temperature. Converted objects are also obtained by hot-pressing the powder compositions at a pressure of at least 1000 lb./sq. in. and a temperature of at least 700° C., but preferably not above 1700° C. Most preferably the temperature is in the range of 1100–1500° C. and the pressure is between 2000 and 5000 lb./sq. in.

The time of heating the powder compositions at the above temperatures must be at least sufficient to insure sintering of the particles of the powder composition if converted compositions having the unexpected characteristics herein disclosed are to be formed. Times of 30 seconds to 30 minutes usually suffice, although longer periods may be employed if desired without detrimental effect. In fact, longer times (e.g., 16 hours or more)

are sometimes advantageous to develop the maximum strength and to increase the electrical resistance. It is preferred that heating, if carried out in air, be rapid to avoid undue oxidation of the powder composition before conversion.

The powder metallurgy compositions may be converted by compressing and firing in the dry state. However, it is convenient in slip-casting or pottery molding techniques to moisten the powder with a liquid, e.g., water to assist in forming it into the desired shape. Acidic aqueous solutions prepared by adding sufficient acetic acid to a dilute aqueous solution of NaOH (containing up to 2% NaOH) to provide a pH less than 7 are particularly desirable for this purpose and produce shaped objects which, after drying and firing, form converted shaped objects having desirable properties. It is essential that any water or other volatile liquid present in the compacted powder be reduced to less than about 3% (by weight) before heat-treatment to prevent rupture of the object during firing.

The powder compositions of this invention, especially those rich in aluminum, can also be formed by compacting and extruding, before firing.

If desired, nitrogen can be introduced during conversion of the powder composition by carrying out the conversion in a nitrogenous atmosphere. When this method of conversion is employed, the original powder composition contains a smaller proportion of nitrogen than is required in the final product and may be entirely devoid of nitrogen. The nitrogen deficient composition is heated in a nitrogenous atmosphere at a temperature of at least 700° C., preferably not about 1700° C., until the desired nitrogen content has been obtained. Most preferably the temperature is in the range of 750°–1500° C. A period of 1–10 hours at a temperature above 700° C. is usually sufficient for nitridation. Although nitridation is usually carried out at approximately atmospheric pressure, i.e., at a pressure in the range of 0.5–2 atmospheres, somewhat higher pressures (not to exceed about 10 atmospheres) are sometimes advantageous in promoting more rapid reaction with nitrogen.

In nitriding, care must be exercised to insure that sufficient nitrogen is introduced so that the nitrided product contains at least 5% nitrogen, but that nitridation is not so complete as to eliminate the free aluminum and silicon necessary for maintenance of self-healing properties on high temperature exposure in air. In preparing compacts for nitridation, a compaction pressure should be employed that is sufficiently low to produce a compact readily penetrated by nitrogen during the nitriding step. For many compositions, pressures of 40,000–100,000 lb./sq. in. can be used without detrimental reduction in the accessibility to nitrogen. However, compositions containing proportions of aluminum in the range of 60–70% aluminum require lower compacting pressures on the order of 20,000–40,000 lb./sq. in. unless nitrogen under pressure and/or long nitriding times are used.

For example, extrusion at about 550° C. which requires pressures of about 50,000-150,000 p.s.i. can be used to prepare "green" rods, pipes and other shapes of the materials of this invention which are then converted by heating to accomplish the reaction $$Al + Si_3N_4 \rightarrow AlN + Si$$

or by sintering in nitrogen to nitride aluminum. If a final composition containing 70% aluminum, 5% nitrogen and 25% silicon is desired, rods of very high "green" strength are obtained by extrusion of a mixture containing aluminum and silicon in the ratio of 70:25. These are difficult to nitride, however, to the extent of 5% nitrogen because of low porosity. On the other hand, extrusion of a composition containing 70% aluminum, 17.5% silicon and 12.5% silicon nitride also gives strong, "green" rods which are readily converted by heating in air at 1100° C. for a few minutes.

A preferred method of fabricating articles of manufacture of this invention comprises forming the powder metallurgy composition into the desired shape, e.g., by cold-pressing, partially sintering the thus shaped composition, i.e., heating the composition to a temperature below which conversion occurs, finishing, i.e., machining, extruding or otherwise working the partially sintered body to the precise shape desired, and then finish-firing to complete conversion of the composition to an article of this invention. The prefiring or partial firing step serves to bind the particles of the powder composition together giving a strong but easily machinable object. The finish-firing step not only converts the machined, partially fired composition but also relieves such composition from the internal stresses normally effected by machining. Since the converted compositions of this invention are more difficult to machine after complete firing, i.e., after calorescence, this method provides a practical route to articles of manufacture, even where dimensional tolerances are low. Use of this method to prepare fixtures for testing tensile strength and transverse rupture strength at high temperatures is illustrated in Example XIII.

With respect to control of dimensions, it has been found that use of aluminum dust and powder, such as atomized aluminum, at the compaction pressures generally employed causes slight expansion of powder compacts during firing. On the other hand, use of flake aluminum, especially in compositions initially containing more than about 47% aluminum, causes slight shrinkage during firing of the compact. In such compositions, containing initially about 47–70% aluminum, dimensional changes during firing can be controlled by using mixtures of aluminum dust and flake in proportions selected to produce slight expansion, slight contraction, or substantially no change in dimension. The exact proportions used are dependent on the compaction pressure employed and can be determined readily for any particular composition.

The invention is illustrated in greater detail by the following examples. In these examples, the starting materials employed were of ordinary commercial purity. Transverse rupture strength was measured with an "Instron" low speed tensile tester Type TT–C–L using a specimen nominally ¼" x ¼" in cross-section supported symmetrically by parallel ceramic rods ⅛" in diameter and 1" apart mounted on a supporting test fixture. Force was applied at the center of the portion of the bar between the supports by the edge (2" long) (radius ¹⁄₁₆") of a V-shaped fixture.

As a standard test of oxidation resistance, the changes in weight and linear dimensions of test specimens were determined after exposure in air to temperatures of 500°, 750°, 1000°, 1100°, 1200°, 1300°, 1400° and 1500° C. for 16 hours at each temperature. After each heating period, the specimen was cooled to room temperature, weighed and measured. Results are expressed as the cumulative percentage change occurring during the heat treatments based on the original values.

EXAMPLE I

Silicon nitride, $Si_3N_4$, powder (1.4 g.) and aluminum powder (1.08 g.) were ground with a mortar and pestle until the mixture was homogeneous. This mixture contained aluminum, nitrogen and silicon in the proportions, by weight, 43.55% Al, 22.3% N and 34.15% Si. The mixture was pelleted in a steel cylindrical die under a pressure of 40,000 p.s.i. at room temperature, and the pellet, after removal from the die, exposed in air for a few minutes (i.e., 1–3 minutes) to the full heat of an oxygen-gas flame. A strong sintering action occurred with calorescence and the resultant converted object was a strong, fileable metal which was difficult to break by hammer blows. There was substantially no evidence of oxidation in the pellet.

EXAMPLE II-A

A mixture of 10.8 g. of aluminum powder and 14.0 g. of $Si_3N_4$ powder was dry-milled for 24 hours at 85 r.p.m. in a porcelain ball-mill (250 cc. capacity) containing a dozen ¾" x ¾" porcelain cylinders. The resultant fine powder, which contained Al, Si and N in the same proportions as in Example I, was screened through a 200-mesh screen (opening 74 microns) to remove 2.1% of coarse material. A portion of the screened powder was hot-pressed in a graphite die at 1200° C. under 1500 p.s.i. pressure to yield a converted bar having a density of 2.40 g./cc. and an electrical resistivity of 0.016 ohm-cm. After exposure for 0.5 hour in air to a temperature of 1200° C., the bar remained strong, was not visibly oxidized and was readily fileable to a bright metallic appearance. X-ray examination of the heat-treated bar showed the presence of AlN, Si, $\alpha$-$Al_2O_3$ and an unidentified material. Several very faint X-ray lines corresponded to the pattern for Al. There was no evidence of the presence of $Si_3N_4$ or $SiO_2$, nor was there any indication that carbides had been produced by reaction of the powder composition with the graphite mold used in hot-pressing. In the standard test of oxidation resistance, the bar remained strong and undeformed and showed only a small dimensional increase (1.52%) up to 1500° C.

EXAMPLE II-B

A mixture of aluminum powder (10.79 g.) and silicon powder (8.43 g.) was ball-milled as described above for a period of 6 hours. The milled mixture was sieved through a 200-mesh screen to remove 7.1% (by weight) of coarse material which was chiefly aluminum. A portion of the remaining powder, which contained by weight 52.79% Al and 47.21% Si, was pressed at room temperature in a steel die under a pressure of 30,000 p.s.i. to a bar having a density of 1.88 g./cc. This bar was laid on a bed of granular alumina contained in a porcelain boat and the assembly introduced into a porcelain tube in a furnace. The tube was purged with a stream of dry nitrogen and the boat and contents then subjected to the following heating cycle:

| Time (hrs.): | Temperature (° C.) |
|---|---|
| 0 | 25 |
| 1 | 550 |
| 1.5 | 750 |
| 2 | 835 |
| 2.5 | 875 |
| 3.5 | 925 |
| 4.66 | 1020 |
| 5.75 | 1140 |
| 6 | 1160 |
| 22 | 25 |

After the heating cycle, the nitrogen flow was turned off and the specimen removed from the furnace. It was a strong, straight, metallic bar of smaller dimensions than before firing and had increased in weight by 10.82% (due to reaction with nitrogen) so that the final density was 2.29 g./cc. Based on this increase in weight and the proportions of Al and Si employed, the composition of the converted bar is 47.64 Al, 9.76 N, 42.6 Si. The converted bar had high impact strength, and showed excellent oxidation resistance in the standard test, the change in weight at 1500° C. being 5.44% and the change in dimensions 1.06%.

EXAMPLES III–XI

These examples illustrate the preparation of aluminum-nitrogen-silicon objects from powder compositions containing various proportions of aluminum, nitrogen and silicon. These proportions are indicated in Table II. The powder compositions were ball-milled as described in Example II-A and were screened through 200 mesh to remove coarse particles. The proportion of coarse particles so removed ranged from 0.7 to 4.1% (by weight). Properties of the converted objects prepared by hot-pressing are shown in Table III, which also shows the hot-pressing conditions employed for conversion. A few of the compositions were also converted by firing in air after cold-pressing. Properties of these converted objects are shown in Table IV.

TABLE II

*Al–N–Si compositions*

| Example No. | Raw Materials | Input Composition | | |
|---|---|---|---|---|
| | | Al | N | Si |
| III | Al, $Si_3N_4$ | 36.62 | 25.04 | 38.34 |
| IV | Al, $Si_3N_4$ | 49.00 | 20.14 | 30.86 |
| V | Al, $Si_3N_4$ | 27.84 | 28.50 | 43.66 |
| VI | Al, $Si_3N_4$ | 53.63 | 18.55 | 27.82 |
| VII | Al, Si, $Si_3N_4$ | 39.05 | 20.09 | 40.86 |
| VIII | Al, Si, $Si_3N_4$ | 35.45 | 18.23 | 46.32 |
| IX | Al, Si, $Si_3N_4$ | 49.02 | 18.90 | 32.08 |
| X | Al, Si, $Si_3N_4$ | 41.14 | 15.86 | 43.00 |
| XI | Al, AlN, $Si_3N_4$ | 41.16 | 26.52 | 32.32 |

TABLE III

*Properties of hot-pressed Al–N–Si compositions [1]*

| Example No. | Density (g./cc.) | Transverse Rupture Strength (p.s.i.) | Test Temperature (° C.) |
|---|---|---|---|
| III | 2.12 | 15,995 | 1,200 |
| IV | 2.51 | 5,135 | 1,200 |
| V | 2.06 | 17,760 / 6,766 | 1,200 / 1,500 |
| VI | 2.45 | 4,655 | 1,200 |
| VII | 2.20 | 6,415 | 1,500 |
| VIII | 2.34 | 2,545 | 1,500 |
| IX | 2.31 | 3,395 | 1,500 |
| X | 2.08 | 3,825 | 1,500 |
| XI | 2.15 | 10,757 | 1,500 |

[1] In Examples III–X, hot-pressing was carried out at 1,250° C. under 2,000 p.s.i. pressure; in Example XI at 1,400° C. and 2,000 p.s.i.

TABLE IV

*Density of air-fired Al–N–Si compositions [1]*

| Example No. | Density (g./cc.) | |
|---|---|---|
| | As Molded | Fired |
| VII | 2.04 | 1.87 |
| VIII | 1.95 | 1.80 |
| IX | 2.04 | 1.90 |
| X | 1.96 | 1.82 |

[1] Powder compositions were molded at room temperature under 30,000 p.s.i. pressure, removed from the mold, and placed in a furnace at 1,150° C. for 2 minutes. In each case, calorescence occurred. The fired bars were 1–5% larger than mold dimensions in each direction.

EXAMPLE XII

A powder composition prepared as described in Example II-A was converted by cold-pressing at 30,000 p.s.i. in a bar mold and heat-treating in vacuum according to the schedule below. For the heat-treatment, the cold-pressed bar was supported on loosely packed alumina granules in an alumina crucible.

| Time (hrs.) | Pressure (mm. of Mercury) | Temp. (° C.) |
|---|---|---|
| 0.5 | 150 | 25 |
| 1.0 | 0.035 | 250 |
| 1.25 | 0.0002 | 25 |
| 1.6 | 0.0002 | 100 |
| 2.0 | 0.0002 | 465 |
| 2.25 | 0.0002 | 675 |
| 2.5 | 0.0002 | 900 |
| 2.75 | 0.0002 | 1,000 |
| 2.83 | 0.0002 | 1,150 |
| 3.17 | 0.0001 | 1,150 |
| 3.5 | 0.00008 | 800 |
| 4.5 | 0.00004 | 150 |

After the fired object had cooled to 150° C., the furnace was opened to the air. The bar produced was strong, straight, non-cracked and slightly porous. During firing, the density changed from 2.10 g./cc. (green density) to 2.00 g./cc. A small decrease in weight amounting to 2.19% and increases in width (0.74%) thickness (2.13%) and length (0.02%) accounted for this decrease in density. The transverse rupture strength of the converted bar was 14,880 p.s.i. at 1200° C. measured in air. As compared with firing by placing the compressed powder object into a preheated furnace in air, the above firing procedure reduces any tendency for splitting or cracking of the object and is accompanied by a slight weight loss in the object instead of the slight weight gain observed when heating is carried out in air.

EXAMPLE XIII

This example illustrates use of compositions of the present invention in fabrication of testing fixtures for transverse rupture and tensile strength measurements. Such fixtures constitute one embodiment of this invention. Testing fixtures are those portions of the test equipment carrying the specimen under test. The general design and dimensions of these fixtures are known and do not constitute part of this invention. It is only necessary that they conform with generally accepted standards such as those of ASTM Tests A438–60T. Two different procedures were employed for fabrication, in each of which the initial composition was a mixture of aluminum powder and silicon nitride powder.

In the first procedure the weighed powders were mixed for 10 minutes in nitrogen in a double-cone blender and then classified with a 100-mesh screen (U.S. Standard Sieve Series). Oversize material which included agglomerates formed during mixing was rejected. The powder passing the 100-mesh screen was packed in a rubber mold which was then vibrated to remove excess air, closed and hydrostatically pressed at 60,000 lb./sq. in. The compact so produced, after removal from the rubber mold, was pre-fired in air at 525° C. for 30 minutes. After cooling to room temperature, the pre-fired compact was machined using metal carbide tools to the desired shape whereupon it was finish-fired in air at 1150° C. for 15 minutes before again cooling to room temperature. The fixtures were then heat-treated by heating according to the schedule shown in Table V:

TABLE V

*Heat-treatment schedule*

16 hours at 500° C., then cooled to 20° C.
16 hours at 750° C., then cooled to 20° C.
16 hours at 1000° C., then cooled to 20° C.
16 hours at 1100° C., then cooled to 20° C.
16 hours at 1200° C., then cooled to 20° C.
16 hours at 1300° C., then cooled to 20° C.
16 hours at 1400° C., then cooled to 20° C.
16 hours at 1500° C., then cooled to 20° C.

Finish-grinding of the completed fixture was unnecessary as the dimensions produced by machining after the pre-firing were maintained during the subsequent treatment within the desired tolerances.

In the second procedure, preparation of the powder and hydrostatic pressing thereof were carried out as described above. The compact was pre-fired in air at 550° C. for 0.5 hour, then machined at room temperature, fired in air at 1150° C. for 15 minutes and cooled in air. The final heat-treatment was carried out in air by raising the temperature of the fired compact at a uniform rate from 500° to 1500° C. over an 84-hour period. As with the first procedure, finish-grinding was unnecessary since desired dimensions produced by machining subsequent to pre-firing were maintained within satisfactory tolerances. Testing fixtures were prepared as shown in Table VI:

TABLE VI

| Fixture No. | Percent Composition | Fabrication Procedure |
|---|---|---|
| 1 | 58 Al, 16.8 N, 25.2 Si | First. |
| 2 | 58 Al, 16.8 N, 25.2 Si | Do. |
| 3 | 40 Al, 24 N, 36 Si | Do. |
| 4 | 40 Al, 24 N, 36 Si | Second. |
| 5 | 45 Al, 22 N, 33 Si | Do. |

The above fixtures were employed in tensile and transverse rupture testing equipment to apply the forces necessary to specimens under test in air at temperatures in the range 500–1650° C. The testing fixture is subjected over a portion of its length to the elevated temperature at which test data is being obtained while other portions of the length are at much lower temperatures. The heated portion of the fixture is also subjected to thermal shock arising by successive introduction and removal from the heated test zone. Of course, the fixture must also withstand the forces inherent in the testing procedure.

The aluminum-nitrogen-silicon fixtures were superior to fixtures fabricated of commercial silicon nitride-bonded silicon carbide and a commercial self-bonded silicon carbide in resistance to heat shock and freedom from "boil out," i.e., from loss of constituents, such as silicon, which are volatile at the testing temperatures. The aluminum-nitrogen-silicon fixtures showed a longer useful life than fixtures fabricated from either of the commercial products.

EXAMPLE XIV

A mixture containing 58% (by weight) of atomized aluminum powder and 42% of silicon nitride powder, i.e., composed of 58% Al, 16.8% N and 25.2% Si, was ball-milled for one hour in a nitrogen atmosphere. The powder was separated from the balls on a 200-mesh screen and a portion of that passing 200 mesh was pressed into a bar (green bar) at 25° C. under a pressure of 30,000 lb./sq. in. applied for 5 minutes. The bar was placed in a vacuum furnace maintained at 200° C. for 16 hours. At the end of this period, the temperature of the furnace was increased over a period of 2 hours to 1200° C. and thereafter maintained at 1200° C. for 2.5 hours. Oxygen was admitted to the furnace to a pressure of 1 atmosphere during the heating at 1200° C. The bar gained 2.87 g. in weight due to the uptake of oxygen giving a product having the final composition 58.0% Al, 25.2% Si, 16.8% N and 9.46% O. The fired bar had a density of 2.24 g./cc. and a porosity of 26%. Transverse rupture strength at 1550° C. was 5040 lb./sq. in.

EXAMPLE XV

A mixture containing 43.5% of atomized aluminum powder and 56.5% of silicon nitride powder, i.e., composed of 43.5% Al, 22.6% N and 33.9% Si, was ball-milled under nitrogen, sieved and a portion pressed into a bar as described in Example XIV. The green bar was heated in a vacuum furnace at 200° C. for 18 hours whereupon argon was admitted to the furnace and the temperature raised to 1200° C. over a period of 2 hours. A temperature of 1200° C. was maintained for an additional 2 hours. The fired bar had a density of 1.99 g./cc. and a porosity of 32%. The transverse rupture strength at 1550° C. was 4620 lb./sq. in.

A second bar was prepared from the powder composition as described above except that nitrogen was employed instead of argon during the firing stage. The fired bar had a density of 2.05 g./cc. and a porosity of 30%. The transverse rupture strength at 1550° C. was 12,050 lb./sq. in. During firing, the bar underwent a gain in weight due to absorption of nitrogen of 4.7%, giving a final composition of 41.5% Al, 32.4% Si, 26.1% N.

EXAMPLE XVI

A mixture containing 58% (by weight) of aluminum flake and 42% of silicon nitride powder and analyzing 58% Al, 16.8% N and 25.2% Si was ball-milled under nitrogen for one hour, sieved through a 200-mesh screen, and a portion pressed into a bar at room temperature using a pressure of 15,000 lb./sq. in. applied for 5 minutes. The bar was fired in air by heating as rapidly as possible to 700° C. holding at this temperature for 0.5 hour, heating to 725° C. and holding for 0.5 hour, heating to 750° C. and holding for 0.5 hour, heating to 775° C. and holding for 0.5 hour, heating to 800° C. and holding for 0.5 hour, heating to 900° C. and holding for one hour, heating to 1000° C. and holding for one hour, and heating to 1150° C. and holding for one hour. The fired bar showed a gain in weight of 15.85% and had a density of 2.00 g./cc. The fired bar had a transverse rupture strength at 1550° C. of 5020 lb./sq. in.

A second bar was prepared in the same manner except that a powder mixture containing 43.5% aluminum flake and 56.5% silicon nitride powder was employed and the firing was carried out in nitrogen. On firing, the bar gained 13.1% in weight corresponding to a final composition of 38.4% Al, 30.0% Si, 31.6% N. The fired bar had a density of 2.07 g./cc. and a transverse rupture strength at 1550° C. of 9685 lb./sq. in.

The converted compositions of this invention, upon being heated at high temperatures in air, undergo some oxidation and nitridation. A significant property of the aluminum-nitrogen-silicon compositions is that dimensional changes are limited to a few percent on exposure in air at temperatures up to 1500° C. Despite the fact that gain in weight may be considerable in the porous bars, i.e., up to 30% converted objects are strengthened and porosity is reduced by such heat-treatment and the bars suffer little distortion or cracking in comparison with other high temperature materials.

Since the converted compositions of this invention, depending chiefly upon their aluminum content, range from electrically insulating to electrically conducting, and are comparable to graphite in density, they are especially useful in high temperature electrical applications. In such application such compositions possess the great advantage over graphite that protection from contact with air is unnecessary. The converted compositions exhibit a transverse rupture strength-to-weight ratio at 1200° C. which ranges up to 10 times that of graphite.

In preparing electrical heating elements, it is sometimes desirable to heat-treat the center portion of a rod, thereby increasing the electrical resistance thereof, but to leave the end portions unheat-treated (or heat-treated only to temperatures of 1100°–1200° C.) and therefore highly conducting. Such elements are especially suitable for application at temperatures in the range of 1000°–1500° C. and above.

The composition of the powders and converted articles, as described above, is given in terms of the major components, i.e., the essential constituents of the converted articles. However, the articles may contain amounts not exceeding 10%, usually less than 5% and preferably less than 3% of other materials such as metals and metal oxides that do not materially affect the novel properties of the articles. Such additional materials are generally present in commercial forms of the materials used in preparing the compositions of this invention. It is preferred that the powder metallurgy compositions be substantially free from uncombined elements such as carbon, titanium, zirconium, molybdenum, chromium, iron, etc. which adversely affect the firing process and the final properties of the articles.

The converted objects of this invention are useful as furnace parts, hot-pressing molds, parts of heat engines, especially those to be air-borne, parts of aircraft subject to high heat by virtue of high velocity in the atmosphere, and testing fixtures. It is a surprising fact that the converted objects can be used as containers for molten aluminum at atmospheric pressure, and in the vacuum evaporation of molten aluminum. The objects have high thermoelectric power and can therefore be used for generation of electricity by the application of heat. When sufficient aluminum is used for the converted objects to be electrically conductive, they serve admirably as electric heating elements.

The foregoing detailed description has been given for clarity of understanding only, and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A composition consisting essentially of aluminum, nitrogen, silicon, and oxygen in the proportions, by weight based on total aluminum, nitrogen and silicon, of 15–17% Al, 5–34% N, 25–55% Si, and 0–30% O, wherein the elements Al, N and Si are present in at least one of the forms selected from the class consisting of elemental aluminum, elemental silicon, aluminum-silicon alloys, aluminum nitride, aluminum oxide, silicon nitride and silicon dioxide, and wherein the total of aluminum and silicon exceeds, by at least 5% by weight, the amount required to react completely with the nitrogen and oxygen present, and oxygen when present is in combined form.

2. A high temperature-resistant converted composition consisting essentially of aluminum, nitrogen, silicon, and oxygen in the proportions, by weight based on total aluminum, nitrogen and silicon, of 15–70% Al, 5–34% N, 25–55% Si, and 0–30% O, the total of aluminum and silicon exceeding, by at least 5% by weight, the amount required to react completely with the nitrogen and oxygen present, the oxygen when present being in the form of its compounds with at least one member of the group consisting of aluminum and silicon; said composition containing a solid continuous matrix structure composed, at least in part, of aluminum nitride, and a metallic structure containing at least 5% based on the weight of the composition of a member selected from the class consisting of elemental silicon and alloys thereof, said metallic structure constituting at most 85% by weight of the converted composition.

3. Compositions of claim 1 in the form of a powder in which at least 75%, by weight, of the powder has a particle size of less than 150 microns.

4. A high temperature-resistant converted composition consisting essentially of aluminum, nitrogen, and silicon in the proportions, by weight, 18–58% Al, 10–28% N, and 25–55% Si, the total of aluminum and silicon exceeding the amount required to react completely with the nitrogen present, by at least 10% by weight; said composition containing (1) a solid continuous matrix structure, refractory at high temperatures, composed, at least in part, of aluminum nitride and (2) a metallic structure containing at least 10% based on the weight of the composition of a member selected from the class consisting of elemental silicon, and alloys thereof, said metallic structure constituting up to 70% of the composition by weight.

5. A high temperature-resistant converted composition consisting essentially of aluminum, nitrogen and silicon in the proportions, by weight, of 58% Al, 16.8% N and 25.2% Si, said composition containing (1) a solid continuous matrix structure composed of aluminum nitride and (2) a metallic structure containing at least 5% based on the weight of the composition of aluminum-silicon alloy.

6. A dimensionally stable, shaped object consisting essentially of aluminum, nitrogen and silicon in the proportions, by weight, of 47.64% Al, 9.76% N and 42.6% Si, said object containing (1) a solid continuous matrix structure composed of aluminum nitride and (2) a metallic structure containing at least 5% based on the weight of the object of aluminum-silicon alloy.

7. High temperature-resistant converted compositions consisting essentially of aluminum, nitrogen and silicon in the proportions, by weight, of 36.58–43.48% Al, 22.57–25.33% N, and 33.95–38.09% si, said compositions being further characterized by being derived from mixtures of elemental aluminum and silicon nitride in the ratios of from 3:1 to 4:1, said composition containing (1) a solid continuous matrix structure composed, at least in part, of aluminum nitride and (2) a metallic structure containing at least 5% based on the weight of the composition of elemental silicon 8. A high temperature-resistant converted composition consisting essentially of aluminum, nitrogen and silicon in the proportions, by weight, of 27.78% Al, 28.84% N and 43.38% Si, said composition containing (1) a solid continuous matrix structure composed, at least in part, of aluminum nitride, and (2) a metallic structure containing at least 5% by weight, of elemental silicon, said metallic structure constituting up to 85% by weight of the composition.

9. Process for preparing high temperature-resistant, converted compositions of claim 2 which comprises heating at a temperature of 700–1500° C. compacts composed of a mixture of elemental aluminum and materials selected from the group consisting of elemental silicon, silicon nitride and aluminum nitride, wherein said mixture contains 15–70% Al, 5–34% N and 25–55% Si, wherein the total aluminum and silicon exceeds by at least 5% by weight, based on converted composition, the amount required to react completely with the nitrogen and oxygen present.

References Cited by the Examiner

UNITED STATES PATENTS

| 2,929,126 | 3/1960 | Bollack et al. | |
| 3,151,994 | 10/1964 | Adlassing | 29—182.5 |
| 3,236,663 | 2/1966 | Gruike et al. | 106—65 |

L. DEWAYNE RUTLEDGE, *Primary Examiner.*

REUBEN EPSTEIN, *Examiner.*

R. L. GRUDZIECKI, *Assistant Examiner.*